United States Patent
Matsuo et al.

(10) Patent No.: US 10,256,622 B2
(45) Date of Patent: Apr. 9, 2019

(54) DIRECT-CURRENT INTERRUPTION DEVICE

(71) Applicant: MEIDENSHA CORPORATION, Tokyo (JP)

(72) Inventors: Takayuki Matsuo, Shizuoka (JP); Kazunobu Oi, Shizuoka (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 15/533,786

(22) PCT Filed: Nov. 30, 2015

(86) PCT No.: PCT/JP2015/083568
§ 371 (c)(1),
(2) Date: Jun. 7, 2017

(87) PCT Pub. No.: WO2016/093094
PCT Pub. Date: Jun. 16, 2016

(65) Prior Publication Data
US 2018/0240627 A1 Aug. 23, 2018

(30) Foreign Application Priority Data
Dec. 12, 2014 (JP) .................................. 2014-252506

(51) Int. Cl.
*H02H 3/087* (2006.01)
*H02H 7/26* (2006.01)
(Continued)

(52) U.S. Cl.
CPC ............ *H02H 3/087* (2013.01); *H02H 7/268* (2013.01); *H01H 33/59* (2013.01); *H01H 33/596* (2013.01); *H01H 33/66* (2013.01)

(58) Field of Classification Search
CPC ........ H02H 3/087; H02H 3/243; H02H 3/445; H02H 7/268
See application file for complete search history.

(56) References Cited

U.S. PATENT DOCUMENTS

| 4,463,400 A | * | 7/1984 | Paice | ................... | H01H 33/596 |
| | | | | | 307/134 |
| 5,214,557 A | * | 5/1993 | Hasegawa | ............ | H01H 33/596 |
| | | | | | 361/11 |

(Continued)

FOREIGN PATENT DOCUMENTS

| JP | 55-4522 A | 1/1980 |
| JP | 5-64323 A | 3/1993 |

(Continued)

OTHER PUBLICATIONS

Noriaki Munakata, Current State of DC Feeding Circuit and Problems in the Future, Railway & Electric Technology, Apr. 2010, vol. 21, No. 4, pp. 62-66.

(Continued)

Primary Examiner — Kyle J Moody
Assistant Examiner — Peter M Novak
(74) Attorney, Agent, or Firm — Foley & Lardner LLP (57) ABSTRACT

To provide a dc interruption apparatus requiring no circuit for producing current zero point forcibly and having a simplified construction adequate for cost reduction, one end of a main contact 30a, 30b, 30c for each phase of a dc high speed vacuum circuit breaker 30 is connected with a positive output end of a corresponding phase of a rectifier 20 for converting ac power to dc power with semiconductor devices arranged in a bridge. The other ends of the main contacts 30a, 30b, 30c are connected together to form a positive side output line 40. A pulse-shaped current flows in an arm of each phase of the rectifier 20 and the current is commutated among the arms sequentially, so that the current (Continued)

is reduced to zero after the commutation. Each of main contacts 30a, 30b, 30c of dc high speed vacuum circuit breaker 30 interrupts the current reduced to zero by the commutation, so that the interruption is easier.

10 Claims, 11 Drawing Sheets

(51) Int. Cl.
*H01H 33/59* (2006.01)
*H01H 33/66* (2006.01)

(56) References Cited

U.S. PATENT DOCUMENTS

2005/0264266 A1* 12/2005 Nakagawa .............. H02M 7/08
 322/25
2015/0274023 A1* 10/2015 Houivet .................. B60L 3/04
 320/108
2017/0261575 A1* 9/2017 Model ................ G01R 33/3815

FOREIGN PATENT DOCUMENTS

| JP | 2003-123569 A | 4/2003 |
| JP | 2004-320977 A | 11/2004 |

OTHER PUBLICATIONS

Shinichi Hase et al., Performance Verification of Direct Current High Speed Circuit Breaker, Electric Railway Substation Direct Current High Speed Vacuum Circuit Breaker, Railway Cybernetics Symposium Bulletin, Paper No. 640, Nov. 12, 2000, pp. 471-475.

* cited by examiner

DIRECT-CURRENT INTERRUPTION DEVICE

TECHNICAL FIELD

The present invention relates to a direct current high speed circuit breaker used in railway dc substation facilities and dc power transmission and distribution facilities.

BACKGROUND ART

A direct current circuit breaker is difficult to achieve interruption or cutting-off performance because there is no zero point in the current to be cut off unlike an alternating current circuit breaker.

An air type circuit breaker is arranged to interrupt an arc stretched in an arc chute. Therefore, the air circuit breaker might become unable to confine the current and cause ground fault.

A vacuum type circuit breaker is arranged, as shown in a dc high speed vacuum circuit breaker (HSVCB) disclosed in Non-patent Documents 1 and 2, for example, to produce a zero current point forcibly by injecting current in a direction opposite to a main circuit current in a vacuum valve, and thereby interrupt the current.

PRIOR ART DOCUMENT

Non-Patent Documents

Non-Patent Document 1: "Current state of dc feeding circuit and problems in the future", Noriaki Munakata, Railway & Electric Technology, 2010 APRIL Vol. 21, No. 4, p. 62~p. 66.

Non-Patent Document 2: "Performance Verification of Direct Current High Speed Circuit Breaker electric railway substation direct current high speed vacuum circuit breaker" Shinichi Hase and five others, Railway Cybernetics Symposium Bulletin (2000.11.12), Paper No. 640, p. 471~p. 475.

SUMMARY OF THE INVENTION

Although the vacuum type circuit breaker can confine current, the construction is very complicated for generating current zero points forcibly, the maintenance and inspection are troublesome, and the complicated structure increases the possibility of failure.

It is an object of the present invention to provide a direct current interruption apparatus which can eliminate the need for a circuit for generating current zero points forcibly, and which is simple in the construction and lower in the cost.

Means for Solving the Problem

According to a first aspect of the present invention, one end or first end of a main contact or main contact unit of a dc high speed vacuum circuit breaker for each phase is connected with a positive output end for one phase of a rectifier including a bridge of semiconductor devices for converting ac power to dc power, and the other ends or second ends of the main contacts or main contact units are connected together.

In the above-mentioned construction, a pulse-shaped current flows through an arm of each phase in the rectifier and the current is commutated sequentially among the arms of the phases, so that the current becomes equal to zero after the commutation. The dc high speed vacuum circuit breaker interrupts the current reduced to zero by the commutation. Therefore, the interruption is easier.

Thus, there is no need for a circuit for producing a current zero point forcibly, the construction of the dc interruption apparatus is simplified, the maintenance and inspection are easier and the const is reduced.

According to a second aspect, the dc high speed vacuum circuit breaker is disposed or installed in a dc distribution board or switch board in the construction of the first aspect.

According to a third aspect, a bulbar, bus or bus line is provided for each phase, and the bus lines of the respective phases are disposed in the dc distribution board and connected, respectively, with the positive output ends of the respective phases of the rectifier in the construction of the second aspect.

In the above-mentioned construction, it is possible to prevent the voltage and current from flowing around from one circuit to another circuit connected with the bus lines, and thereby keep the voltage and current of each phase independent from those of the other phases.

According to a fourth aspect, the rectifier comprises a six-pulse rectifier for full-wave rectification of all the phases of a three-phase ac power source in the construction according to the first to third aspects.

According to a fifth aspect, the rectifier comprises a twelve-pulse rectifier including a first rectifier and a second rectifier, ac sides of the first and second rectifiers being connected, respectively, with two mutually-insulated secondary windings of a multi-winding transformer, and positive output ends of the first and second rectifiers are connected so that the positive output end of the first rectifier for one phase is connected with the output end of the second rectifier for the same phase, in the construction according to one of the first to third aspects.

According to a sixth aspect, the rectifier comprises a twelve-pulse rectifier including a first rectifier and a second rectifier, ac sides of the first and second rectifiers being connected, respectively, with two mutually-insulated secondary windings of a multi-winding transformer, and positive output ends of the first and second rectifiers are connected so that the positive output end of the first rectifier for one phase or a given phase is connected with the positive output end of the second rectifier for a different phase different from the given phase.

In the above-mentioned construction, the main contact of one phase of the dc high speed vacuum circuit breaker receives alternately the flow of current of a given phase of the first rectifier and the flow of current of another phase different from the given phase of the second rectifier. Therefore, the peak value or crest value in the waveform of the current flowing through each main contact of the dc high speed vacuum circuit breaker is lower, and the zero points are produced more frequently (twice as compared to the construction according to the fifth aspect) so that the period is shorter. Consequently, the dc interruption apparatus can perform the interruption quickly.

According to a seventh aspect, a backflow preventing diode is provided for each of the phases, and the second ends of the main contacts of the dc high speed vacuum circuit breaker are connected together through anode-cathode structures of backflow preventing diodes.

According to an eighth aspect, a negative electrode end of the rectifier is connected through an anode-cathode structure of a flyback diode to a common connection point to which the second ends of the main contacts of the dc high speed vacuum circuit breaker are connected, in the construction according to one of the first to seventh aspect.

In the above-mentioned construction, at the time of interruption of the dc high speed vacuum circuit breaker, the current due to a residual energy of a reactance contained in the dc load flows through the flyback diode, and does not pass through the dc high speed vacuum circuit breaker. Therefore, it is possible to prevent the time until the zero point from being elongated.

(1) According to the first to eighth aspects of the present invention, the circuit for forcibly producing zero current points is not required, the construction of the dc interruption apparatus is simplified, the operation for maintenance and inspection is easier and the cost is reduced.

(2) According to the third aspect, it is possible to connect two or more sets of the dc distribution boards and the dc high speed vacuum circuit breakers in parallel with the bus lines each provided for one phase. Therefore, the construction is readily used for the facilities for transmitting and distributing electricity to a plurality of dc loads connected in parallel with respect to the rectifier.

(3) According to the sixth aspect, the peak value in the waveform of the current flowing through the dc high speed vacuum circuit breaker is lower, and the period for producing zero points is shorter (twice as compared to the construction according to the fifth aspect), and the interruption apparatus can perform the interruption quickly.

(4) According to the seventh aspect, it is possible to prevent the voltage and current from flowing around from one circuit to another circuit connected with the bus lines, and thereby keep the voltage and current of each phase independent from those of the other phases.

(5) According to the eighth aspect, at the time of interruption by the dc high speed vacuum circuit breaker, the current due to a residual energy of a reactance contained in the dc load flows through the flyback diode, and does not pass through the dc high speed vacuum circuit breaker. Therefore, it is possible to prevent the time until the zero point from being elongated.

MODES FOR CARRYING OUT THE INVENTION

Although an embodiment or embodiments of the present invention is explained hereinafter with reference to the drawings, the present invention is not limited to examples of the embodiment(s). A dc substation of an earlier technology is arranged to connect a plus side of the dc output of a rectifier with a dc switch board or dc distribution board and to transmit electricity to contact line(s) or trolley wire(s) for railway, through a single pole dc circuit breaker. In the examples of the embodiment(s), by contrast, the arms for the respective phases of a rectifier are connected to a dc distribution or switch board individually without connecting together, and the currents of the phases are merged together into a dc output on the output side of a three pole dc circuit breaker.

Figure 1:
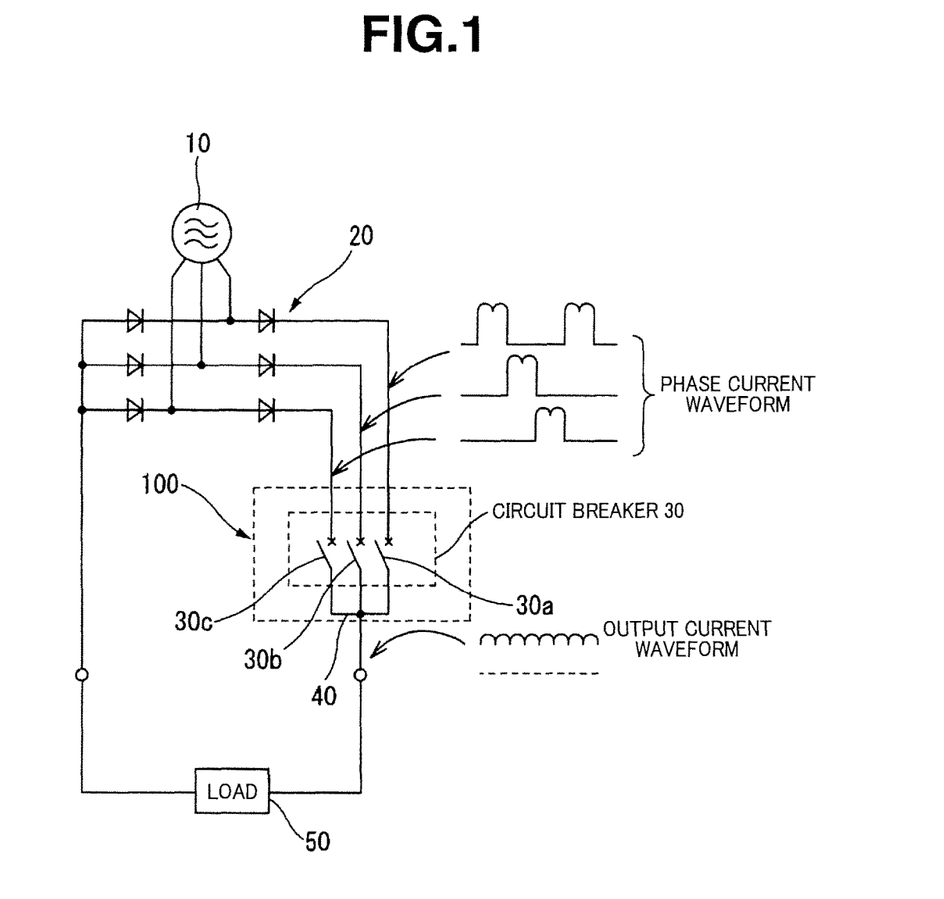
FIG. 1 is a diagram showing an embodiment of the present invention.

A substation according to the embodiment is constructed as shown in FIG. 1, for example. A rectifier 20 is arranged to convert ac power of a three-phase ac power source or power supply 10 to dc power. For example, the rectifier 20 includes a three-phase bridge connection of semiconductor devices such as diodes. Rectifier 20 includes a positive side output end or terminal for each of the phases (that is, a cathode terminal of the diode of an upper arm). A direct current high speed vacuum circuit breaker or interruption device 30 includes a main contact 30a, 30b or 30c for each of the phases. The dc high speed vacuum circuit breaker 30 shown in FIG. 1 is installed in a direct current distribution board or switch board 100. The main contact or main contact unit or interrupter 30a, 30b or 30c of each phase includes one end or first end connected with a corresponding one of the positive side output ends of rectifier 20. The other ends or second ends of main contacts 30a, 30b and 30c are connected together and thereby formed into a positive side output line 40 of the rectifier 20. A load 50 is connected between the positive side output line 40 and a negative electrode of the rectifier 20.

Although the positive side output line 40 is formed in the distribution board 100 in FIG. 1, the positive side output line 40 may be formed outside the distribution board 100.

Moreover, it is optional to form a connection point by connecting the second ends of main contacts 30a, 30b and 30c together, instead of forming the positive side output line 40.

A pulse-shaped current passing through a zero point flows in an arm of each phase of the rectifier 20, and the pulse-shaped current commutates sequentially among the arms. In the configuration of FIG. 1, the current passing through each of the main contacts 30a, 30b and 30c of the dc high speed vacuum circuit breaker 30 is in the pulsed waveform through the zero point. Therefore, the interruption by the circuit breaker is easier.

In this way, the dc high speed vacuum circuit breaker 30 is arranged to cut off the current having a zero point generated by commutation. Therefore, the dc high speed vacuum circuit breaker 30 does not require a circuit for producing a current zero point forcibly as in the dc high speed vacuum circuit breaker of the earlier technology, and hence makes it possible to simplify the construction of the dc interruption apparatus, to facilitate the maintenance and inspection and to reduce the cost.

Following is explanation on practical examples in which the dc interruption apparatus according to the present invention is applied to railway dc substation facilities.

Practical Example 1

Figure 2:
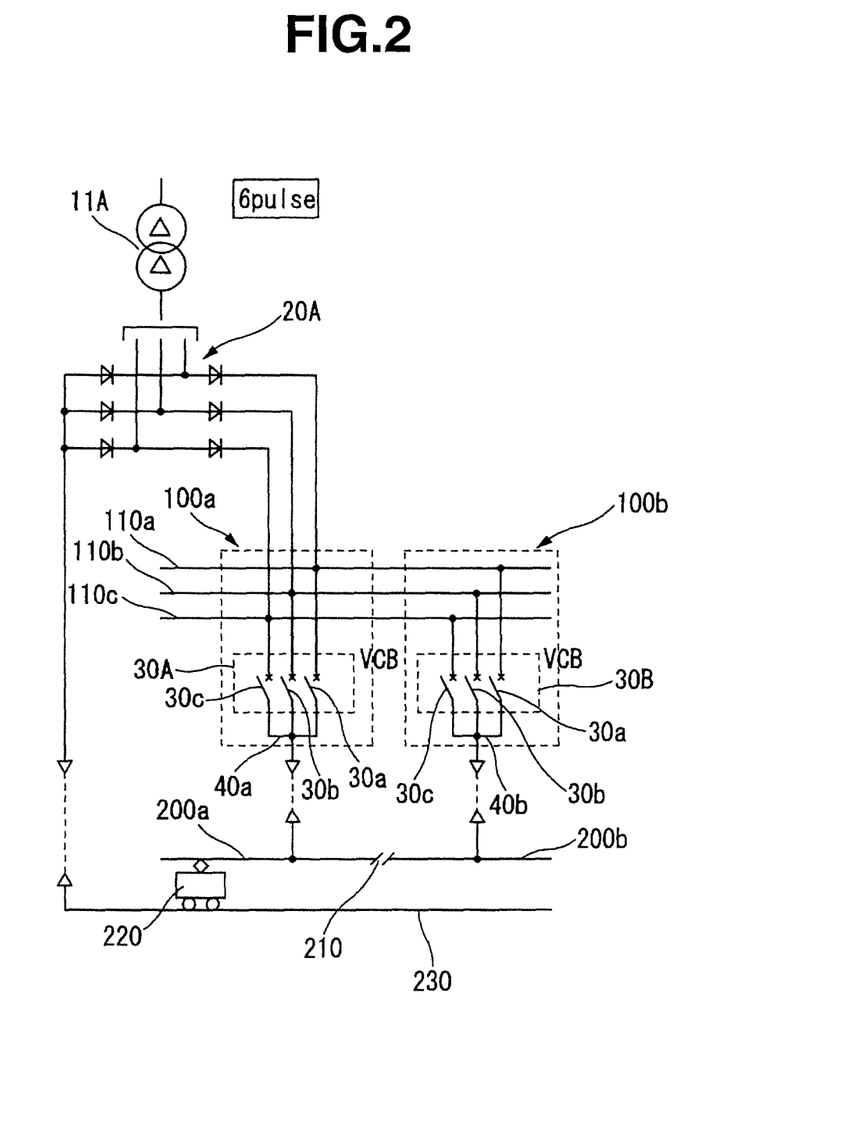
FIG. 2 is a diagram showing a dc substation according to a first practical example of the present invention.

In FIG. 2 showing the construction of a first practical example, the present invention is applied to a six-phase (three-phase full wave) rectifier (six pulse rectifier (pulse=the number of conversion phases)) 20A. Moreover, bus lines or busbars 110a, 110b and 110c are provided in dc switch boards or dc distribution boards 100a and 100b provided together with the rectifier 20A. Each bus line or bus 110a, 110b or 110c is a conductor connected with a positive output end of a corresponding one of the phases of the six-pulse rectifier 20A and a common connection point between the main contacts 30a, 30b or 30c of the corresponding phase of dc high speed vacuum circuit breakers 30A and 30B.

In FIG. 2, a component 11A is a transformer for rectifier. The primary side of rectifier transformer 11A is connected with an ac power source on a higher level. The rectifier transformer 11A has a structure of Δ-Δ connection. Components 200a and 200b are electric car lines or trolley wires connected, respectively, with positive side output lines 40a and 40b. A section 210 is a dead section. There is provided electric car or cars 220. The negative electrode side of the six-pulse rectifier 20A is connected with rail(s) 23.

The output power of six-pulse rectifier 20A is supplied to the electric car or railway vehicle 220 through the bus lines 110a, 110b and 110c in the dc distribution boards 100a and 100b, the main contacts 30a, 30b and 30c of dc high speed vacuum circuit breakers 30A and 30B, the positive side output lines 40a and 40b and the electric car lines 200a and 200b.

In this way, the bus lines 110a, 110b and 110c are provided so that one bus line is provided for each phase. Accordingly, it is possible to connect a plurality of the dc distribution boards (100a, 100b) and a plurality of the dc high speed vacuum circuit breakers (30A, 30B) in parallel, and to supply the electric power to a plurality of the loads (the electric car(s) 220 running along the electric car lines 200a, 200b) connected in parallel with respect to the six-pulse rectifier 20A.

Figure 3:
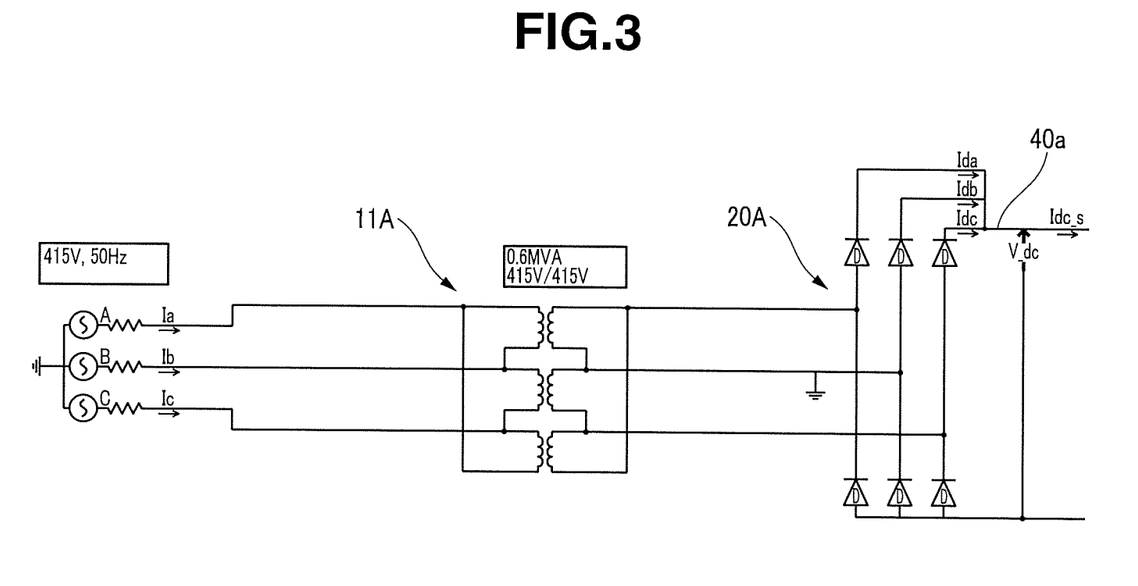
FIG. 3 is a circuit diagram showing a circuit for simulating currents and voltages in various parts of the dc substation according to the first practical example.
Figure 4:
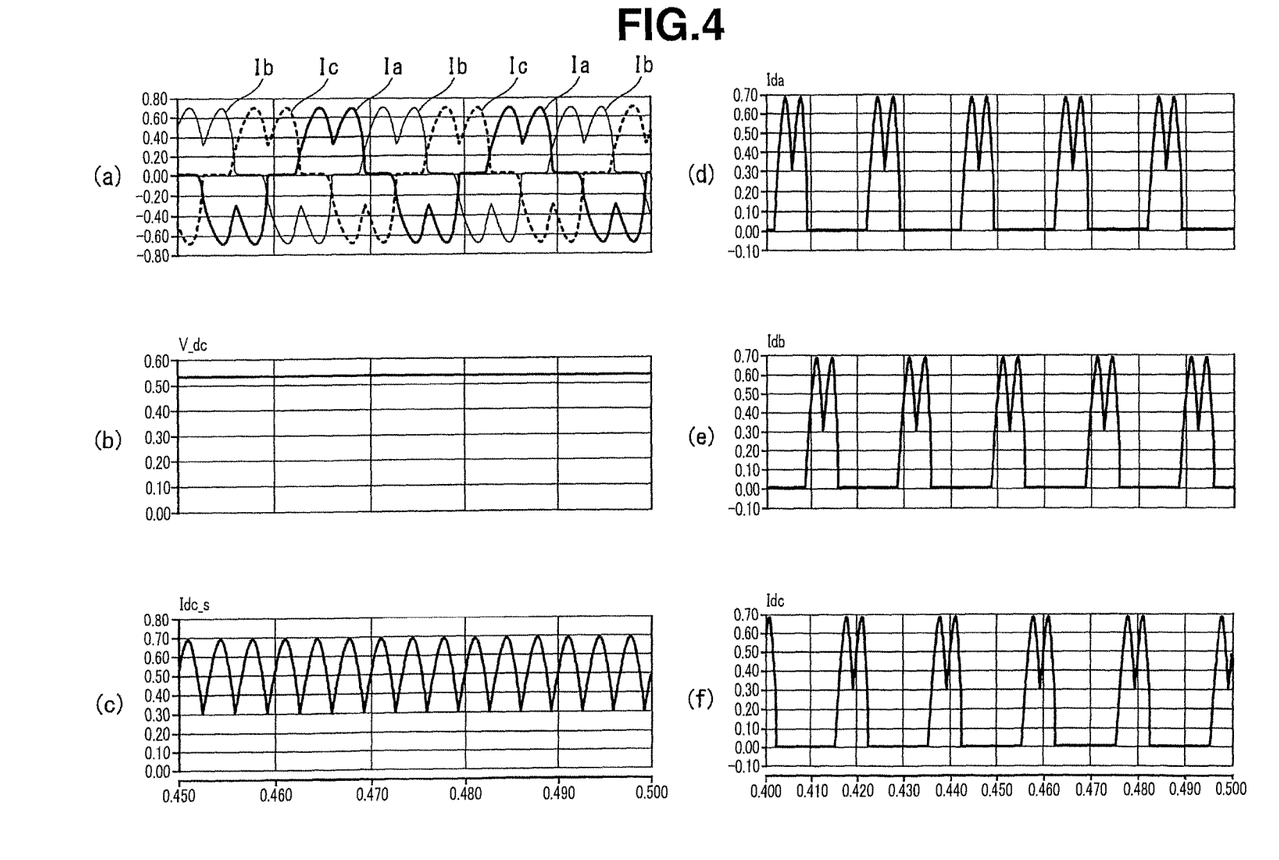
FIG. 4 is a view showing waveforms of voltages and currents at various parts of the circuit of FIG. 3.

FIGS. 3 and 4 show the results of simulation for examining the voltages and currents at various portions of the dc substation of FIG. 2. FIG. 3 shows the circuit configuration and uses the same reference numerals for indicating the same components shown in FIG. 2.

In FIG. 3, the ac power source is a source of 415V, 50 Hz, and the rated capacity of rectifier transformer 11A of the Δ-Δ connection is 0.6 MVA, 415/415V. The dc distribution boards 100a, 100b, bus lines 110a, 110b, 110c, the main contacts 30a, 30b, 30c of dc high speed vacuum circuit breakers 30A, 30B and the load facilities of FIG. 2 are omitted in FIG. 3.

The phase currents Ia, Ib and Ic flowing through primary windings of the rectifier transformer 11A are shown in FIG. 4(a). FIGS. 4(d), 4(e) and 4(f) show currents Ida, Idb and Idc flowing, respectively, through the main contacts 30a, 30b and 30c of the phases of the dc high speed vacuum circuit breaker 30A according to this practical example. Each of the currents Ida, Idb and Idc is a current flowing through a circuit segment between the positive side output terminal of six-pulse rectifier 20A for one of the phases and the positive side output line 40a. FIG. 4(b) shows the dc voltage V_dc between the positive side output line 40a and the negative terminal of the 6-pulse rectifier 20A. FIG. 4(c) shows the current Idc_s flowing from the positive side output line 40a to the load.

As shown in FIGS. 4(d), 4(e) and 4(f), the current Ida, Idb or Idc of each phase is in the form of pulse-shaped waveform (rabbit ears shaped, so called), and these currents commutate successively, so that the zero points appear successively.

Consequently, the dc high speed vacuum circuit breaker 30A can interrupt the current easily at the current zero points.

The dc high speed vacuum circuit breaker 30B can be operated in the same manner.

Practical Example 2

Figure 5:
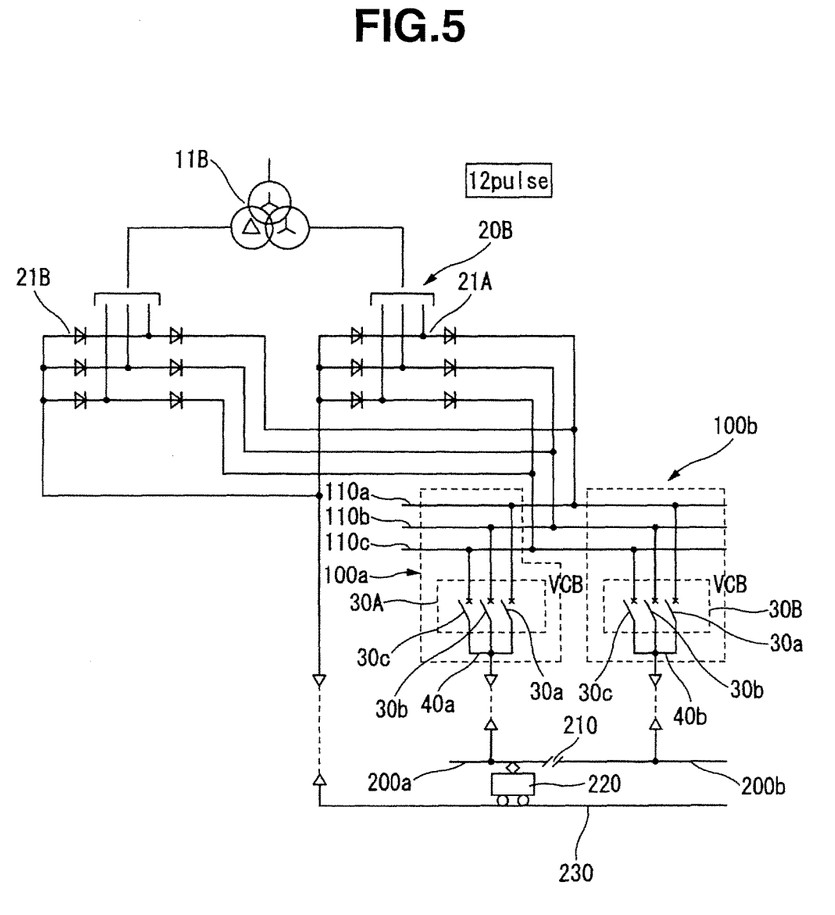
FIG. 5 is a diagram showing a dc substation according to a second practical example of the present invention.

In a second practical example, the present invention is applied to a 12-pulse rectifier (12 pulse rectifier) 20B as shown in FIG. 5. The same components are given the same reference numerals as in FIG. 2.

In FIG. 5, a component 11B is a transformer for rectifier. A star winding section of the primary side of rectifier transformer 11B is connected with an ac power source on a higher level, and the rectifier transformer 11B has a structure including Y-Y connection and Y-Δ connection. The 12-pulse rectifier 20B includes a rectifier 21A including an ac side connected with the star winding section on the secondary side of rectifier transformer 11B and a rectifier 21B including an ac side connected with the delta winding section on the secondary side of rectifier transformer 11B. The positive output ends (the cathode terminals of the diodes of upper arms) of the rectifiers 21A and 21B for the same phase are connected together.

The output power of 12-pulse rectifier 20B is supplied to the electric car or cars 220 through the bus lines 110a, 110b and 110c in the dc distribution boards 100a and 100b, the main contacts 30a, 30b and 30c of dc high speed vacuum circuit breakers 30A and 30B, the positive side output lines 40a and 40b and the electric car lines 200a and 200b.

In this way, the bus lines 110a, 110b and 110c are provided so that one bus line is provided for each phase. Accordingly, it is possible to connect a plurality of the dc distribution boards or distribution boards (100a, 100b) and a plurality of the dc high speed vacuum circuit breakers (30A, 30B) in parallel, and to supply the electric power to a plufality of the loads (the electric car(s) 220 running along the electric car lines 200a, 200b) connected in parallel with respect to the 12-pulse rectifier 20B.

Figure 6:
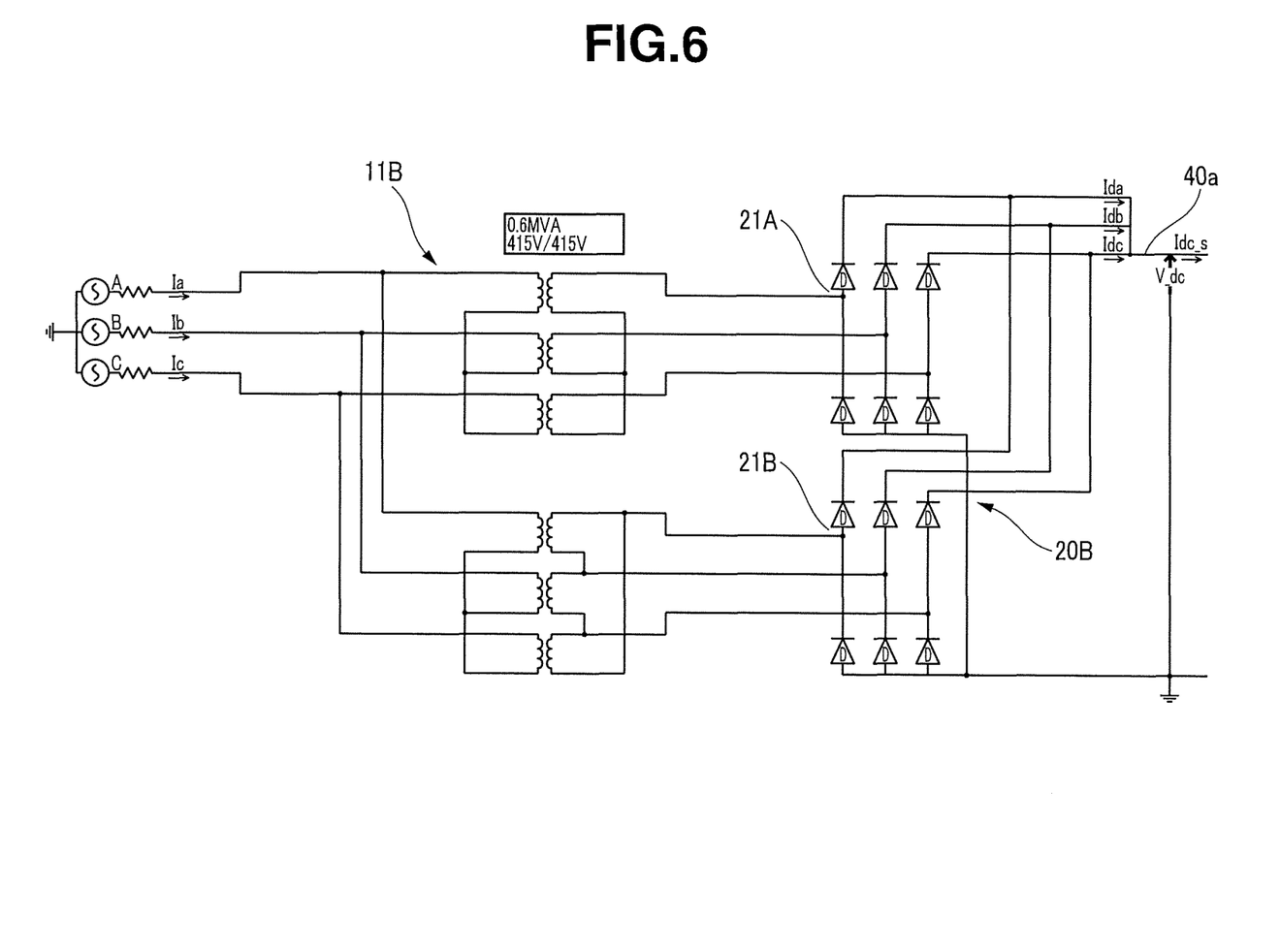
FIG. 6 is a circuit diagram showing a circuit for simulating the currents and voltages in various parts of the dc substation according to the second practical example.
Figure 7:
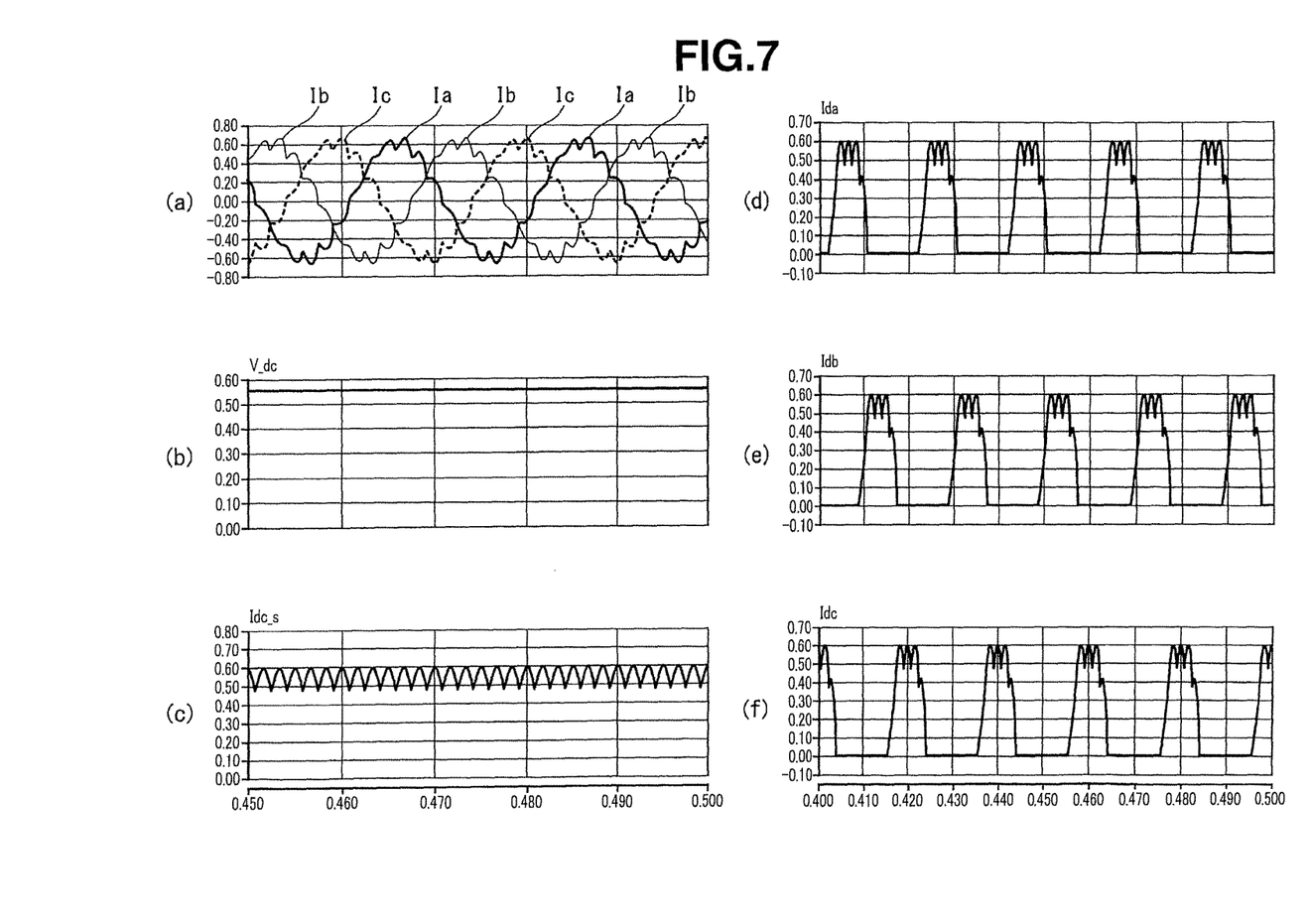
FIG. 7 is a view showing waveforms of voltages and currents at various parts of the circuit of FIG. 6.

FIGS. 6 and 7 show the results of simulation of examining the voltages and currents at various portions of the dc substation of FIG. 5. FIG. 6 shows the circuit configuration and uses the same references numerals for indicating the same components shown in FIG. 5.

In FIG. 6, the ac power source is a source of 415V, 50 Hz, and the rated capacity of rectifier transformer 11B having the Y-Y connection and Y-Δ connection is 0.6 MVA, 415/415V. The dc distribution boards 100a, 100b, bus lines 110a, 110b, 110c, the main contacts 30a, 30b, 30c of dc high speed vacuum circuit breakers 30A, 30B and the load facilities of FIG. 5 are omitted in FIG. 6.

The phase currents Ia, Ib and Ic flowing through primary windings of the rectifier transformer 11B are shown in FIG. 7(a). FIGS. 7(d), 7(e) and 7(f) show currents Ida, Idb and Idc flowing, respectively, through the main contacts 30a, 30b and 30c of the phases of the dc high speed vacuum circuit breaker 30A according to this practical example. The currents Ida, Idb and Idc are currents flowing, respectively, through circuit segments between the positive side output terminals of 12-pulse rectifier 20B for the respective phases and the positive side output line 40a. FIG. 7(b) shows the dc voltage V_dc between the positive side output line 40a and the negative side of the 12-pulse rectifier 20B. FIG. 7(c) shows the current Idc_s flowing from the positive side output line 40a to the load.

As shown in FIGS. 7(d), 7(e) and 7(f), the current Ida, Idb or Idc of each phase has a pulse-shaped waveform (rabbit ears shaped, so called), and these currents commutate successively, so that the zero points appear successively. Consequently, the dc high speed vacuum circuit breaker 30A can interrupt the current easily at the current zero points.

The dc high speed vacuum circuit breaker 30B can be operated in the same manner.

In the second practical example, the positive output ends of the same phase of the rectifiers 21A and 21B are connected together. Therefore, the current of rectifier 21A and the current of rectifier 21B are added for the same phase at the same timing. Accordingly, as shown in FIGS. 7(d), 7(e) and 7(f), the currents have higher peak values.

The interruption timings of contacts 30a, 30b and 30c of the dc high speed vacuum circuit breaker 30A shown in FIG. 5 are explained hereinbelow with reference to FIGS. 7(d), 7(e) and 7(f) showing the current waveforms with the horizontal axis representing the time (t) and the vertical axis representing the current value.

(1) First, at a time instant 0.410(s), for example, the electrodes of the main contacts 30a, 30b and 30c of the dc high speed vacuum circuit breaker 30A are opened. In this case, the current is already equal to zero at one of the three poles. In this example, the current Idc (the current flowing through the main contact 30c) is equal to zero as shown in FIG. 7(f). Therefore, the interruption of current Idc is completed.

After the time instant 0.410(s), irregular 8 pulse currents continue flowing through the main contacts 30a and 30b of the remaining two poles.

(2) At a time instant 0.411(s), the interruption of current Ida is completed by the main contact 30a of the pole where the current becomes equal to zero first among the remaining two poles. After the time instant 0.411(s), the irregular 8 pulse current continues flowing through the main contact 30b of the remaining one pole.

(3) At a time instant 0.418(s), the main contact 30b of the last pole completes the interruption of current Idb at the current zero point of Idb.

In this way, the current interruption is completed at all the main contacts of the dc high speed vacuum circuit breaker 30A.

The dc high speed vacuum circuit breaker 30B is operated in the same manner.

Practical Example 3

Figure 8:
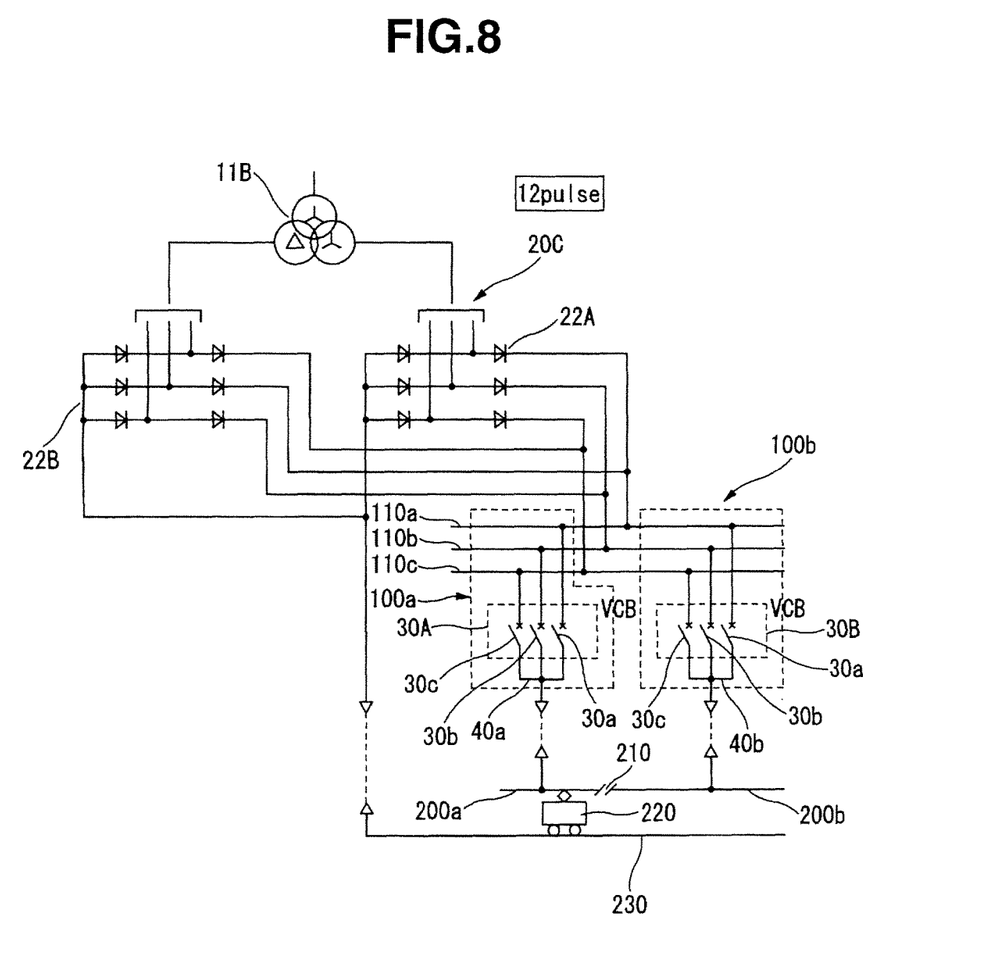
FIG. 8 is a diagram showing a dc substation according to a third practical example of the present invention.

In a third practical example, the present invention is applied to a 12-pulse rectifier (12 pulse rectifier) 20C as shown in FIG. 8. The same components are given the same reference numerals as in FIG. 5.

In FIG. 8, a component 11B is a transformer for rectifier. A star winding section of the primary side of rectifier transformer 11B is connected with an ac power source on a higher level, and the rectifier transformer 11B has a structure including Y-Y connection and Y-Δ connection. The 12-pulse rectifier 20C includes a rectifier 22A including an ac side connected with the star winding section on the secondary side of rectifier transformer 11B and a rectifier 22B including an ac side connected with the delta winding section on the secondary side of rectifier transformer 11B. The positive output ends (the cathode terminals of the diodes of the upper arms) of the rectifiers 22A and 22B for two different phases are connected together.

The output power of 12-pulse rectifier 20C is supplied to the electric car or cars 220 through the bus lines 110a, 110b and 110c in the dc distribution boards 100a and 100b, the main contacts 30a, 30b and 30c of dc high speed vacuum circuit breakers 30A and 30B, the positive side output lines 40a and 40b and the electric car lines 200a and 200b.

In this way, the bus lines 110a, 110b and 110c are provided so that one bus line is provided for each phase. Accordingly, it is possible to connect a plurality of the dc distribution boards or distribution boards (100a, 100b) and a plurality of the dc high speed vacuum circuit breakers (30A, 30B) in parallel, and to supply the electric power to a plurality of the loads (the electric car(s) 220 running along the electric car lines 200a, 200b) connected in parallel with respect to the 12-pulse rectifier 20C.

Figure 9:
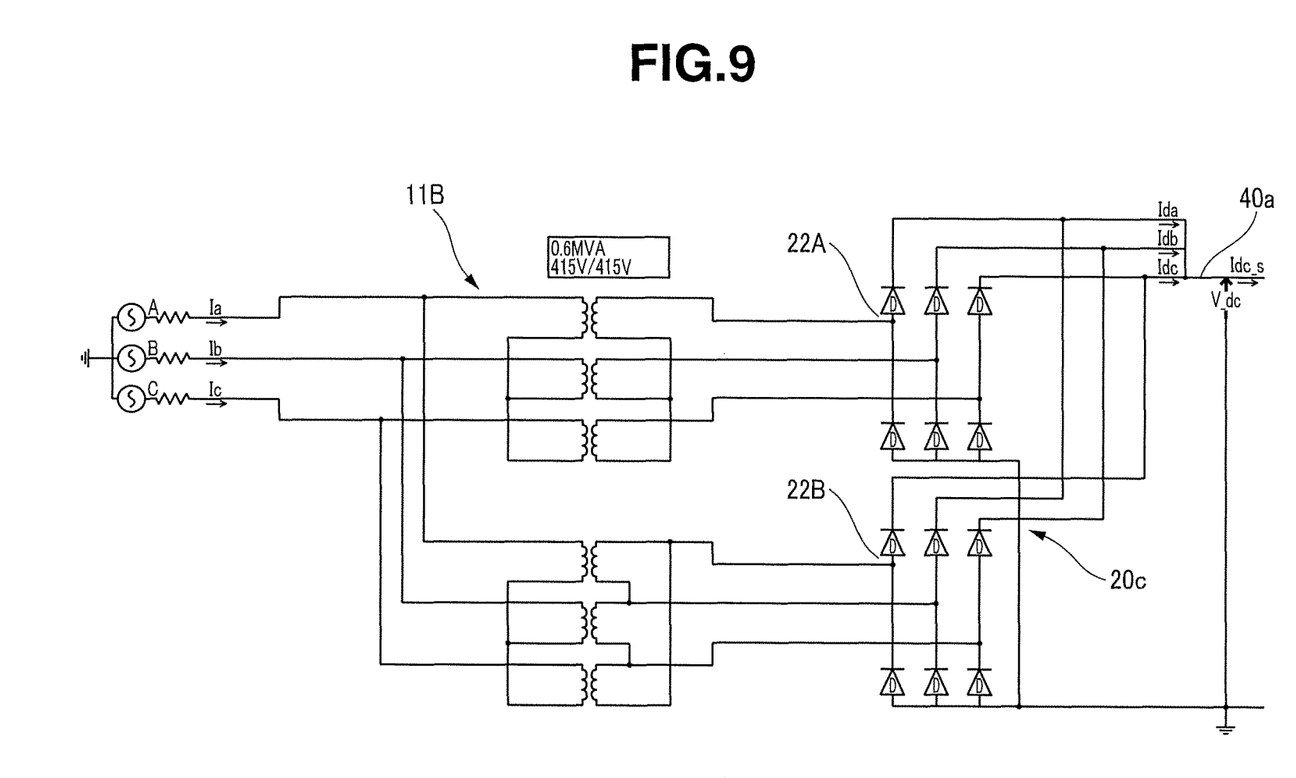
FIG. 9 is a circuit diagram showing a circuit for simulating the currents and voltages in various parts of the dc substation according to the third practical example.
Figure 10:
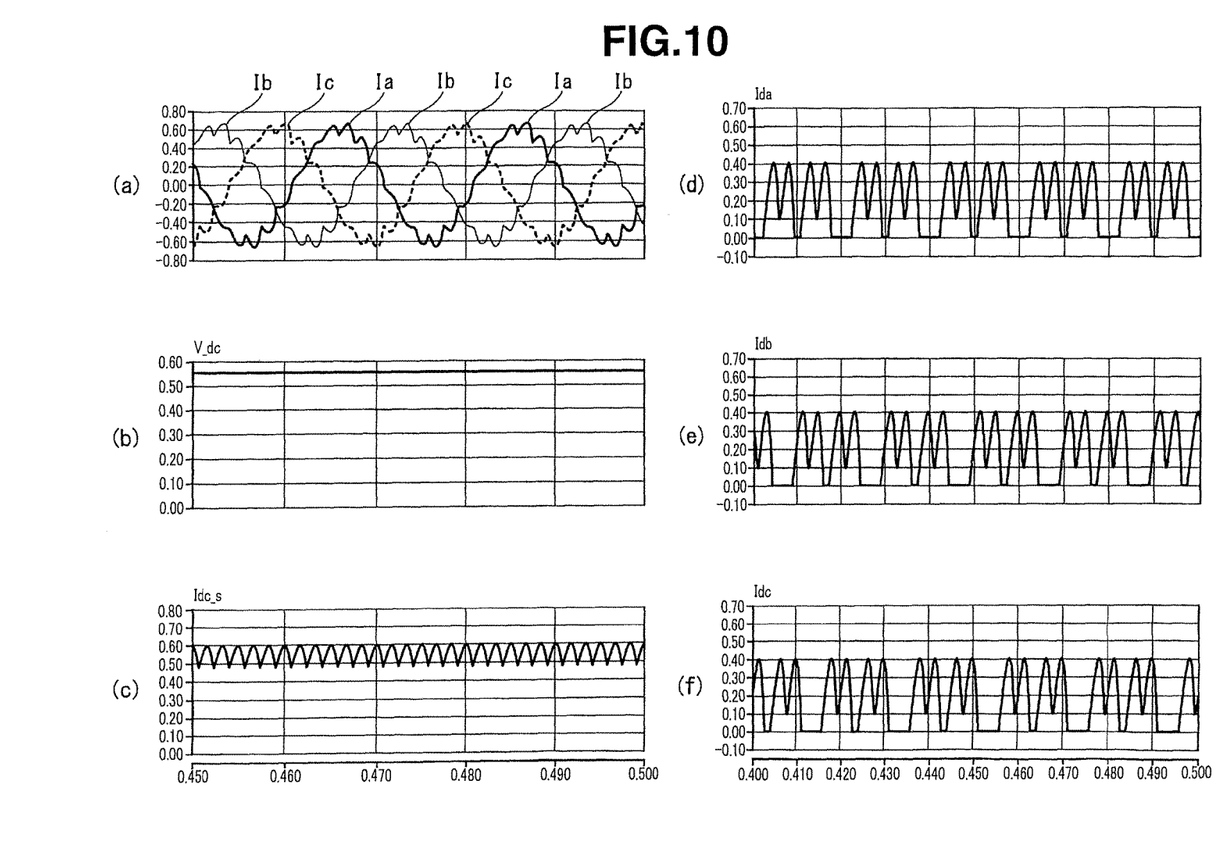
FIG. 10 is a view showing waveforms of voltages and currents at various parts of the circuit of FIG. 9.

FIGS. 9 and 10 show the results of simulation of examining the voltages and currents at various portions of the dc substation of FIG. 8. FIG. 9 shows the circuit configuration and uses the same references numerals for indicating the same components shown in FIG. 8.

In FIG. 9, the ac power source is a source of 415V, 50 Hz, and the rated capacity of rectifier transformer 11B having the Y-Y connection and Y-Δ connection is 0.6 MVA, 415/415V. The dc distribution boards 100a, 100b, bus lines 110a, 110b, 110c, the main contacts 30a, 30b, 30c of dc high speed vacuum circuit breakers 30A, 30B and the load facilities of FIG. 8 are omitted in FIG. 9.

The phase currents Ia, Ib and Ic flowing through primary windings of the rectifier transformer 11B are shown in FIG. 10(a). FIGS. 10(d), 10(e) and 10(f) show currents Ida, Idb and Idc flowing, respectively, through the main contacts 30a, 30b and 30c of the phases of the dc high speed vacuum circuit breaker 30A according to this practical example. The currents Ida, Idb and Idc are currents flowing, respectively, through circuit segments between the positive side output terminals of 12-pulse rectifier 20C for the respective phases and the positive side output line 40a. FIG. 10(b) shows the dc voltage V_dc between the positive side output line 40a and the negative side of the 12-pulse rectifier 20C. FIG. 10(c) shows the current Idc_s flowing from the positive side output line 40a to the load.

As shown in FIGS. 10(d), 10(e) and 10(f), the current Ida, Idb or Idc of each phase has a pulse-shaped waveform (rabbit ears shaped, so called), and these currents commutate successively, so that the zero points appear successively. Consequently, the dc high speed vacuum circuit breaker 30A can interrupt the current easily at the current zero points.

In the third practical example, the positive output end of the rectifier 22A for each phase is connected with the positive output end of the rectifier 22B for another phase. Therefore, the currents from rectifiers 22A and 22B flow alternately at different timings. Accordingly, as shown in FIGS. 10(d), 10(e) and 10(f), the phase currents Ida, Idb and Idc have lower peak values.

Consequently, current zero points are generated more frequently at shorter periods (twice faster) and hence the apparatus can interrupt the current faster.

Practical Example 4

If, in the case in which a plurality of circuits are connected with the bus lines 110a, 110b and 110c in the configurations of FIG. 2, FIG. 5 and FIG. 8, a circuit breaker is already set on or closed for another circuit, the bus lines 110a, 110b and 110c are short-circuited and the currents and voltages of the respective phases are unable to maintain the independence.

Accordingly, in the fourth practical example, back flow preventing diode or diodes are interposed between the output terminal of the circuit breaker and the current junction point (the positive side output line 40a, 40b).

Moreover, when the reactance contained in the load side dc circuit is greater than a predetermined value, the energy stored in the reactance dulls the interruption of the current at the time of interruption of great current such as short circuiting current, and thereby increases the time until the current zero point is reached.

To prevent this problem, in the fourth practical example, the current due to the residual energy in the reactance is separated from the current passing through the circuit breaker by a flyback diode connected between the negative end of the rectifier and the positive side output line 40a, 40b.

Figure 11:
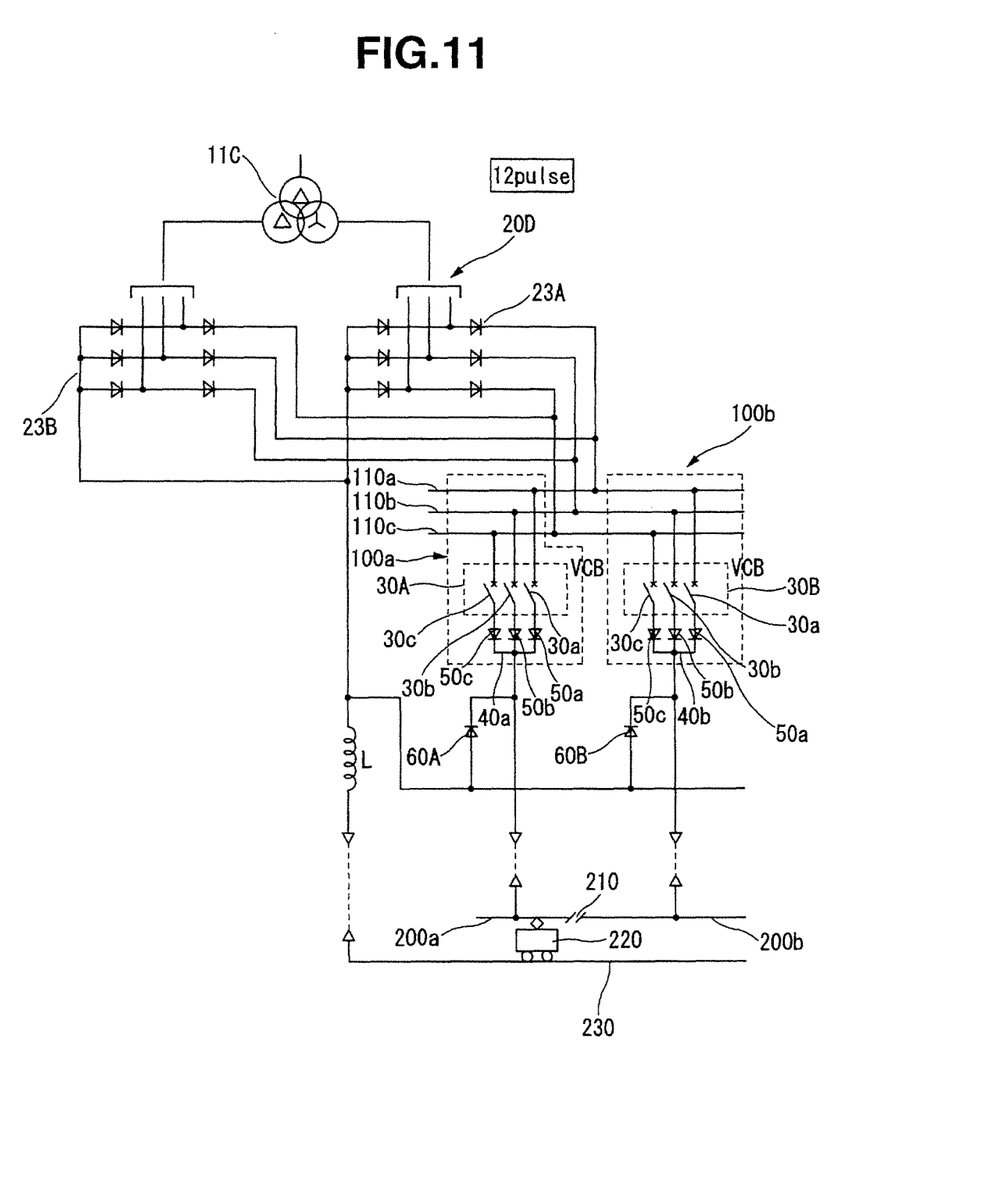
FIG. 11 is a diagram showing a dc substation according to a fourth practical example of the present invention.

FIG. 11 shows the configuration of an example of the fourth practical example. The same reference numerals are used for the same parts appearing in FIG. 8. In FIG. 11, a component 11C is a transformer for rectifier. A delta winding section of the primary side of rectifier transformer 11C is connected with an ac power source on a higher level, and the rectifier transformer 11C has a structure including Δ-Δ connection and Δ-Y connection.

A 12-pulse rectifier 20D includes a rectifier 23A including an ac side connected with the star winding section on the secondary side of rectifier transformer 11C and a rectifier 23B including an ac side connected with the delta winding section on the secondary side of rectifier transformer 11C. The positive output ends (the cathode terminals of the diodes of the upper arms) of the rectifiers 23A and 23B for two different phases are connected together.

The bus lines 110a, 110b and 110c in the dc distribution board 100a are connected with the positive side output line 40a, respectively, through the main contacts 30a, 30b and 30c of the dc high speed vacuum circuit breaker 30A and the anode-cathode structures of back flow preventing diodes 50a, 50b and 50c.

The bus lines 110a, 110b and 110c in the dc distribution board 100b are connected with the positive side output line 40b, respectively, through the main contacts 30a, 30b and 30c of the dc high speed vacuum circuit breaker 30B and the anode-cathode structures of back flow preventing diodes 50a, 50b and 50c.

The back flow preventing diodes 50a, 50b and 50c may be provided in the distribution boards 100a, 100b or may be disposed outside the distribution boards 100a, 100b.

The negative ends of rectifiers 23A and 23B are connected to the positive side output line 40a through the anode-cathode structure of a flyback diode 60A, and connected, through the anode-cathode structure of a flyback diode 60B, to the positive side output line 40b. In FIG. 11, L is a reactance included in the load side dc circuit.

In this construction, the back flow preventing diodes 50a, 50b and 50c prevent the flow of currents from the positive side output lines 40a and 40b to the bus lines 110a, 110b and 110c of the respective phases. Therefore, the apparatus can prevent the voltage and current from flowing around from one circuit to another and maintain the independence of the voltage and current for each phase.

Furthermore, at the time of interruption of the dc high speed vacuum circuit breakers 30A, 30B, a current due to residual energy of the reactance L flows through the flyback diode 60A or 60B without passing through the dc high speed vacuum circuit breakers 30A, 30B. Therefore, this configuration can prevent prolongation of the time until the current zero point.

The addition of backflow preventing diode or diodes 50a, 50b and 50c and the flyback diode or diodes 60A, 60B is applicable to the dc substations shown in FIG. 2 and FIG. 5 without being limited to the dc substation of FIG. 11. The same operations and effects can be achieved in the case in which the addition is applied to the substations of FIG. 2 and FIG. 5.

The present invention is applicable not only to the six-pulse rectifier and the twelve-pulse rectifier, but also to other multipulse rectifiers. In this case, too, the same operations and effects can be achieved.

The invention claimed is:

1. A dc interruption apparatus comprising:
   a rectifier to convert ac power to dc power with a plurality of semiconductor devices arranged in a bridge and including a positive output end for each of a plurality of phases; and
   a dc high speed vacuum circuit breaker including a main contact for each of the plurality of phases, each of the main contacts including a first end connected with the positive output end of the rectifier of a corresponding one of the plurality of phases and a second end, the second ends of the main contacts of the dc high speed vacuum circuit breaker being connected together to a common connection point which is connected with a load.

2. The dc interruption apparatus as claimed in claim 1, wherein the dc high speed vacuum circuit breaker is installed in a dc distribution board.

3. The dc interruption apparatus as claimed in claim 2, wherein a bus line is provided for each phase, and the bus lines of the plurality of phases are disposed in the dc distribution board and connected, respectively, with the positive output ends of the rectifier for the plurality of phases.

4. The dc interruption apparatus as claimed in claim 1, wherein the rectifier comprises a six-pulse rectifier for full-wave rectification of all phases of a three-phase ac power source.

5. The dc interruption apparatus as claimed in claim 1, wherein the rectifier comprises a twelve-pulse rectifier including a first rectifier and a second rectifier, ac sides of the first and second rectifiers being connected, respectively, with two mutually-insulated secondary windings of a multi-winding transformer, and
   a positive output end of the first rectifier for each of the plurality of phases is connected with a positive output end of the second rectifier for an identical phase so that the plurality of phases of the positive output ends connected together are identical to each other.

6. The dc interruption apparatus as claimed in claim 1, wherein the rectifier comprises a twelve-pulse rectifier including a first rectifier and a second rectifier, ac sides of the first and second rectifiers being connected, respectively, with two mutually-insulated secondary windings of a multi-winding transformer, and
   a positive output end of the first rectifier for each phase is connected with a positive output end of the second rectifier for a different phase so that the plurality of phases of the positive output ends connected together are different from each other.

7. The dc interruption apparatus as claimed in claim 3, wherein the second ends of the main contacts of the dc high speed vacuum circuit breaker are connected together to the common connection point through anode-cathode structures of backflow preventing diodes each provided for one of the plurality of phases.

8. The dc interruption apparatus as claimed in claim 1, wherein a negative end of the rectifier is connected through an anode-cathode structure of a flyback diode to a common connection point to which the second ends of the main contacts of the dc high speed vacuum circuit breaker are connected together.

9. The dc interruption apparatus as claimed in claim 1, wherein the rectifier includes, as the positive output end, a first positive output end for a first phase of the ac power, a second positive output end for a second phase of the ac power and a third positive output end for a third phase of the ac power;

wherein the dc high speed vacuum circuit breaker includes, as the main contact, first, second and third main contacts each of which includes the first end and the second end, the first end of the first main contact being connected with the first positive output end of the rectifier for the first phase, the first end of the second main contact being connected with the second positive output end of the rectifier for the second phase, and the first end of the third main contact being connected with the third positive output end of the rectifier for the third phase; and wherein the second ends of the first, second and third main contacts are connected together to the common connection point which is connected with the load.

10. The dc interruption apparatus as claimed in claim 1, wherein the load includes an electric line for supplying electricity to at least one electric car, and the at least one electric car is adapted to run along the electric line.

* * * * *